(12) United States Patent
Ono et al.

(10) Patent No.: US 7,229,664 B2
(45) Date of Patent: Jun. 12, 2007

(54) PROCESS FOR PRODUCING LIGHT-EMITTING PHOSPHOR

(75) Inventors: Keiji Ono, Tsukuba (JP); Susumu Miyazaki, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 260 days.

(21) Appl. No.: 09/810,225

(22) Filed: Mar. 19, 2001

(65) Prior Publication Data
US 2001/0054869 A1 Dec. 27, 2001

(30) Foreign Application Priority Data
Mar. 29, 2000 (JP) .............................. 2000-090947

(51) Int. Cl.
*B05D 7/00* (2006.01)
(52) U.S. Cl. ...................... 427/212; 427/213; 427/215; 427/219; 427/226
(58) Field of Classification Search ................ 427/212, 427/213, 215, 219, 226
See application file for complete search history.

(56) References Cited

U.S. PATENT DOCUMENTS

| | | | | |
|---|---|---|---|---|
| 4,825,124 A | * | 4/1989 | Sigai | 313/486 |
| 4,937,218 A | * | 6/1990 | Ramirez de Aqudelo et al. | 502/152 |
| 4,946,707 A | * | 8/1990 | Kasenga et al. | 427/64 |
| 4,975,619 A | | 12/1990 | Datta et al. | |
| 5,039,654 A | * | 8/1991 | Mizuta et al. | 505/233 |
| 5,156,884 A | * | 10/1992 | Tanitsu et al. | 427/558 |
| 5,196,229 A | * | 3/1993 | Chau | 427/66 |
| 5,747,100 A | * | 5/1998 | Petersen | 427/64 |
| 5,998,047 A | * | 12/1999 | Bechtel et al. | 428/690 |
| 6,177,030 B1 | | 1/2001 | Shoji et al. | |

OTHER PUBLICATIONS

Derwent Abstract of JP-A No. 10-195428.
Patent Abstracts of Japan, 07063900, Mar. 10, 1995, vol. 1995, No. 06.
Patent Abstracts of Japan, 2000121797, Apr. 28, 2000, vol. 2000, No. 7.

* cited by examiner

*Primary Examiner*—Elena Tsoy
(74) *Attorney, Agent, or Firm*—Sughrue Mion, PLLC

(57) ABSTRACT

A process for producing a vacuum ultraviolet ray-excited light-emitting phosphor comprising the steps of
mixing a phosphor with a aluminum-based coupling agent, and calcining the mixture.

4 Claims, No Drawings

PROCESS FOR PRODUCING LIGHT-EMITTING PHOSPHOR

BACKGROUND OF THE INVENTION

1. Field of the Invention

The present invention relates to a process for producing a vacuum ultraviolet ray-excited light-emitting phosphor. Particularly, the present invention relates to a process for producing a vacuum ultraviolet ray-excited light-emitting phosphor used in various displays of light emitting type such as a plasma display panel (hereinafter, sometimes abbreviated as "PDP") and the like, and the phosphorpaste. More particularly, the present invention relates to a process for producing a vacuum ultraviolet ray-excited light-emitting phosphor having excellent life property of brilliance, which is suitable as a material of a fluorescent surface of the display, and the phosphor paste.

2. Description of the Related Art

In cathode-ray tubes and color liquid crystal displays, increase in size of images is difficult, on the other hand, PDP is a flat panel display enabling it, and expected to be used for indication or as a large screen television in public spaces. PDP is a display element constituted by placing a large number of fine discharging spaces (hereinafter, sometimes abbreviated as "display cell") into matrix form, and wherein a discharge electrode is provided in each display cell and a phosphor is applied on the inner wall of each cell. In a space in each display cell, a rare gas such as He—Xe, Ne—Xe, Ar and the like is filled and by applying voltage on a discharge electrode, discharge occurs in the rare gas and vacuum ultraviolet ray is radiated. The phosphor is excited by this vacuum ultraviolet ray and emits visible ray. Images are displayed by allotting positions of display cells emitting light. By use of phosphors emitting three primary colors, blue, green and red, full color display can be carried out.

Recently, there are intense developments on phosphors for PDP and a rare gas lamp emitting light by utilizing vacuum ultraviolet ray radiated by rare gas discharge and the like. However, a practically used phosphor for a vacuum ultraviolet ray-excited light-emitting device has insufficient life property of light-emitting brilliance.

As a method for improving life property of light-emitting brilliance of a phosphor, namely as a method for suppressing reduction by time of the brilliance of a phosphor when excited by vacuum ultraviolet ray having constant strength, there is suggested a method for protecting the surface of a phosphor from plasma by coating the surface with a film of a metal oxide or with fine particles. For example, JP-A No. 10-195428 discloses a technology to coat the surface of a phosphor particle with a film of a metal oxide or with fine particles, by allowing a metal alkoxide to adhere to the surface of a phosphor particle and by calcining this. However, since a metal alkoxide manifests quick hydrolysis speed and it is difficult to form on the surface of a phosphor particle a metal oxide film having uniform thickness or metal oxide fine particles having uniform particle size, life property of light-emitting brilliance by vacuum ultraviolet ray excitation is not sufficient.

SUMMARY OF THE INVENTION

An object of the present invention is to provide a process for producing a vacuum ultraviolet ray-excited light-emitting phosphor, having excellent life property of light-emitting brilliance by vacuum ultraviolet ray excitation, and the phosphor paste having such a property.

The present inventors have intensively studied to solve the above-mentioned object, and have found that a kind of phosphor obtained by mixing a phosphor with an aluminum-based coupling agent has improved life property of light-emitting brilliance by vacuum ultraviolet ray excitation, and is suitable for a vacuum ultraviolet ray-excited light-emitting phosphor, and have completed the present invention.

Namely, the present invention provides a process for producing a vacuum ultraviolet ray-excited light-emitting phosphor comprising the steps of mixing a phosphor with an aluminum-based coupling agent and calcining the mixture. The present invention also provides a phosphor paste containing a phosphor and an aluminum-based coupling agent. Further, the present invention provides a plasma display panel containing the above-mentioned phosphor or obtained by applying the above-mentioned phosphor paste.

DETAILED DESCRIPTION OF THE INVENTION

The present invention will be illustrated in detail below.

As the phosphor powder used in the present invention, there can be used aluminate-based phosphors which are blue phosphors for PDP, aluminate-based phosphors or silicate-based phosphors which are green phosphors, and rare earth metal oxide-based phosphors which are red phosphors, and further specifically, there are listed compounds of the composition formula: $BaMgAl_{10}O_{17}$:Eu as aluminate-based blue phosphors, compounds of the composition formula: $BaAl_{12}O_{19}$:Mn as aluminate-based green phosphors, compounds of the composition formula: $Zn_2SiO_4$:Mn as silicate-based green phosphors, compounds of the composition formula: (Y, Gd) $BO_3$:Eu or $Y_2O_3$:Eu as rare earth metal oxide-based red phosphors, as well as other compounds.

The present invention provides a technology for forming a strong film on the surface of a phosphor particle by using a coupling agent. In the present invention, a coupling agent is added to and mixed with a powder of a phosphor to coat the surface of the phosphor particle with the coupling agent, then the coated particle is calcined. By the calcination, a metal component contained in the coupling agent is converted into an oxide to form a film. As the formed film is compact and strong, the film plays a role as a protective film for a phosphor. Therefore, life property of light-emitting brilliance of a phosphor is improved.

As the coupling agent, silane-based coupling agents, titanium-based coupling agents and aluminum-based coupling agents are listed. Among silica, titania and alumina which are oxides obtained by calcining silane, titanium and aluminum, silica and titania absorb vacuum ultraviolet ray, therefore, the latter two are not suitable as a vacuum ultraviolet ray-excited light emitting phosphor of the present invention, consequently, an aluminum-based coupling agent is used as the coupling agent in the present invention.

Aluminum-based coupling agents have a hydrophilic group and a hydrophobic group, and as the hydrophilic group contained in the aluminum-based coupling agent used in the present invention, there are listed, for example, $CH_3CH(CH_3)O—$, $C_8H_{17}—O—$, $C_2H_5C(CH_2—O—CH_2—CH=CH_2)_2—CH_2—O—$ and the like, and as the hydrophobic group, there are listed, for example, $—C(=O)—C_{17}H_{35}$, $—O—P(=O)(—OH)—O—P(=O)—(O—C_8H_{17})_2$, $—O—C_2H_4—NH—C_2H_4—NH_2$, $—O—C(CH_3)=CH—C(=O)—CH_2—C(=O)—C_{16}H_{33}$ and the like. Among them, aluminum-based coupling agents containing a 1,3-diketone type structure such as $—O—C(CH_3)=CH—C(=O)—CH_2—C(=O)—C_{16}H_{33}$ are preferable. An aluminum-based coupling agent containing a 1,3-diketone type structure can be distributed uniformly in a paste without forming a precipitate of an aluminum compound since the hydrolysis speed thereof is extremely high. Since an aluminum-based coupling agent containing a 1,3-diketone type structure can be mixed uniformly with a phosphor, a phosphor may be protected by formation of a uniform film on the surface of the phosphor particle by calcining the mixture, consequently, reduction by time of light-emitting brilliance by excitation with vacuum ultraviolet ray may be effectively suppressed.

The amount of an aluminum-based coupling agent mixed is preferably from 0.01 to 40 parts by weight based on 100 parts by weight of a phosphor, for effectively improving life property of light-emitting brilliance. Further, when used as a phosphor paste, the content of an aluminum-based coupling agent in the phosphor paste is preferably from 0.01 to 20% by weight.

For producing a vacuum ultraviolet ray-excited light emitting phosphor according to the present invention, first, a powder of a phosphor and an aluminum-based coupling agent are mixed. As the mixing method, known methods can be used. For example, there is listed a method in which an aluminum-based coupling agent is dissolved in a solvent such as alcohol and the like, then, a powder of a phosphor is added to this, and stirred or mixed using an ultrasonic wave vibration and the like. A precipitate is recovered from this mixed solution by filtration, supernatant-removal, evaporation or spray drying, and dried. Then, the recovered precipitate is calcined. The calcination conditions include preferably temperatures from 300 to 600° C. in air atmosphere, further preferably temperatures from 400 to 500° C. in air atmosphere. Further, the calcination time is preferably from 10 minutes to 4 hours.

As the method for producing PDP using a vacuum ultraviolet ray-excited light emitting phosphor according to the present invention, there can be used a known method as disclosed, for example, in JP-A No. 10-195428. Namely, vacuum ultraviolet ray-excited light emitting phosphors used for blue, green and red light-emission are mixed with an organic solvent and a binder composed of a polymer compound such as for example cellulose-based compounds and polyvinyl alcohol to prepare phosphor pastes. The pastes are applied by a method such as screen printing and the like on the partition surface and substrate surface in the form of stripe equipped with an address electrode and compartmented with a partition on the inner surface of a rear substrate, and the applied pastes are dried to form respective phosphor layers. On the layers, a surface glass substrate equipped with a transparent electrode and a bus electrode along direction crossing the phosphor layers and provided with a dielectric layer and a protective layer on the inner side is overlapped, and adhered. The inner gas is exhausted and a rare gas of lower pressure such as Xe, Ne and the like is filled to form an electric discharging space. Thus, PDP can be produced.

The phosphor paste of the present invention can be obtained by a known method using a known binder providing it contains an aluminum-based coupling agent. For example, a binder composed of a polymer compound such as cellulose-based compounds and polyvinyl alcohol, and an organic solvent and an aluminum-based coupling agent may also be mixed.

A vacuum ultraviolet ray-excited light emitting phosphor obtained by the present invention and the phosphor paste of the present invention have excellent life property of light-emitting brilliance, and extremely useful for various displays such as PDP and the like.

The vacuum ultraviolet ray-excited light emitting phosphor and the phosphor paste of the present invention can be used not only under vacuum ultraviolet ray excitation, but also under excitation with ultraviolet ray, cathode ray or X-ray.

According to the present invention, a vacuum ultraviolet ray-excited light emitting phosphor having improved life property of light-emitting brilliance by vacuum ultraviolet ray excitation can be obtained, and a phosphor paste suitable for PDP or a rare gas lamp can be obtained, namely, the present invention is extremely useful industrially.

EXAMPLE

Then, the following examples will illustrate the present invention further in detail, but do not restrict the scope of the present invention. In the examples, as the aluminum-based coupling agent containing a 1,3-diketone type structure, PlaneAct AL-M (trade name: Ajinomono Co., Inc.) was used.

Example 1

0.4 g of PlaneAct AL-M was dissolved in 7.8 g of isopropyl alcohol, and 2 g of a commercially available blue phosphor $BaMgAl_{10}O_{17}$:Eu was added to this, and dispersed by a ultrasonic wave for 30 minutes. Then, the dispersion was allowed to stand still over night and day to deposit a precipitate, then, the supernatant was removed, and the precipitate was recovered and dried. Then the dried precipitate was calcined at 450° C. in atmosphere for 30 minutes, to obtain a vacuum ultraviolet ray-excited light emitting phosphor.

The resulted vacuum ultraviolet ray-excited light emitting phosphor was placed in a gas atmosphere having a composition of 5 vol % Xe-95 vol % Ne under a pressure of 13.2 Pa, and exposed to 100 W plasma for 1 hour. The phosphor powder was removed, and the brilliance thereof was measured, resulting in reduction in brilliance suppressed to 15% as compared with before the plasma exposure.

Comparative Example 1

The commercially available blue phosphor $BaMgAl_{10}O_{17}$:Eu used in Example 1 was placed in an atmosphere having a composition of 5 vol % Xe-95 vol % Ne under a pressure of 13.2 Pa without treatment with an aluminum-based coupling agent, and exposed to 100 W plasma for 1 hour. The phosphor powder was removed, and the brilliance thereof was measured, resulting in reduction in brilliance of as much as 40% as compared with before the plasma exposure.

What is claimed is;

1. A process for producing a vacuum ultraviolet ray-excited light-emitting phosphor comprising the steps of mixing an aluminate phosphor compound with a coupling agent comprising an aluminum compound, and calcining the mixture, wherein the coupling agent contains a 1,3-diketone structure.

2. The process for producing a vacuum ultraviolet ray-excited light-emitting phosphor according to claim 1, wherein the aluminate phosphor compound is $BaMgAl_{10}O_{17}$:Eu or $BaAl_{12}O_{19}$:Mn.

3. The process for producing a vacuum ultraviolet ray-excited light-emitting phosphor according to claim 1 or 2, wherein the content of the coupling agent is from 0.01 to 40 parts by weight based on 100 parts by weight of the phosphor.

4. A process for producing a vacuum ultraviolet ray-excited light-emitting phosphor comprising the steps of mixing an aluminate phosphor compound with a coupling agent comprising an aluminum compound, and calcining the mixture.

* * * * *